Jan. 8, 1935.  H. M. LOCHRANE  1,987,239
VALVE MECHANISM ADJUSTING DEVICE
Filed July 8, 1932
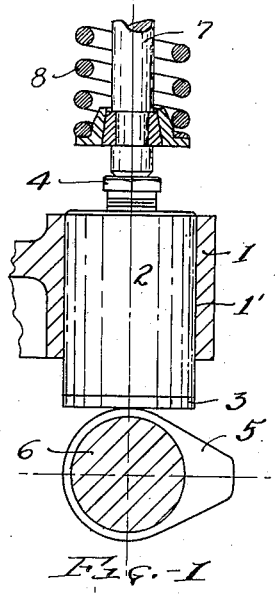
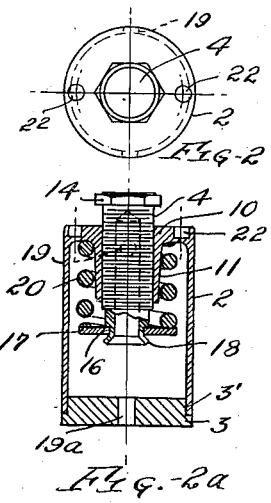
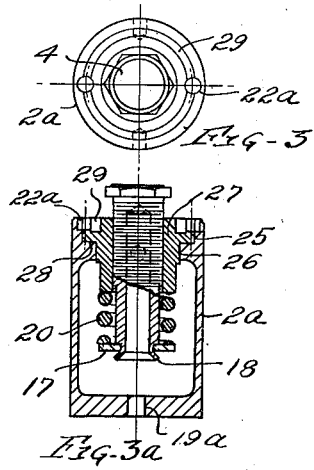
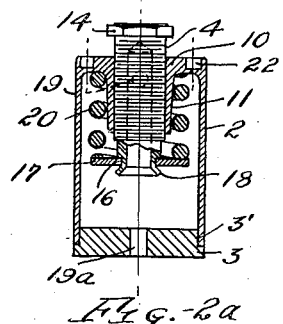
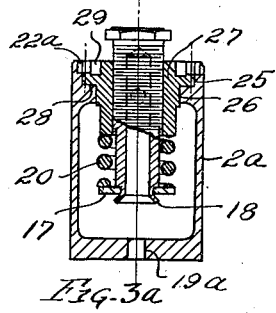
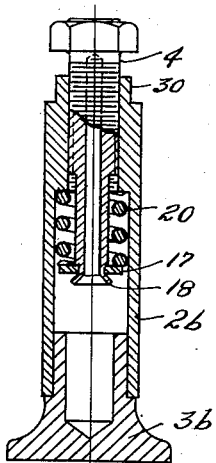
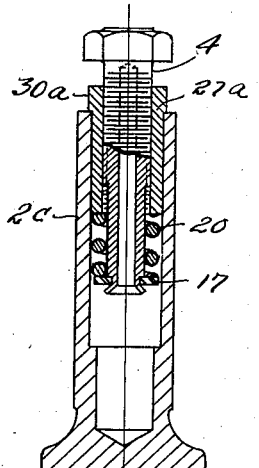
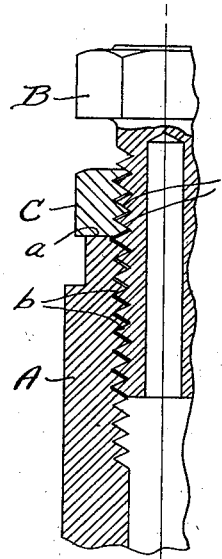
Example of Prior Art
FIG. 7
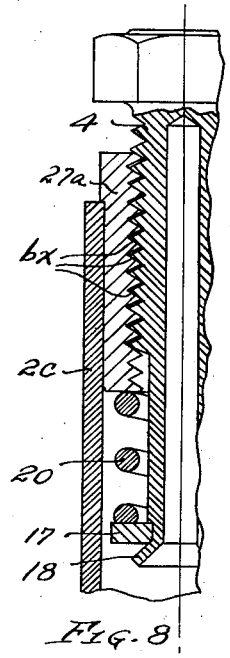
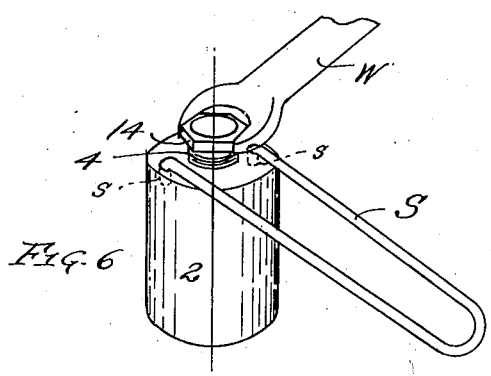
INVENTOR
Harold M. Lochrane
BY
Soule & Leonard
ATTORNEYS Patented Jan. 8, 1935

1,987,239

UNITED STATES PATENT OFFICE 1,987,239

VALVE MECHANISM ADJUSTING DEVICE

Harold M. Lochrane, Cleveland, Ohio

Application July 8, 1932, Serial No. 621,418

7 Claims. (Cl. 123—90)

The general object of this invention is to provide an improved and simplified adjusting device to obtain desired play in a valve operating mechanism.

A specific object is to provide a self locking adjustable valve tappet.

Another object is to provide a valve adjusting device employing threaded members, relatively rotatable for adjustment, in which the complementary contact surfaces of the respective threads opposing axial collapse of the device are maintained in abutting relationship during and after adjustment, wherefore when the members are telescoped to a given position of adjustment, they may be locked without any change in the overall length of the device.

A further object is to provide a valve operating mechanism adjustment wherein the force or forces tending to lock the relatively adjustable parts act constantly and uniformly to maintain alignment and setting of the parts.

Other objects and features of the invention will become apparent from the following description relating to the accompanying drawing, wherein I have shown my preferred forms. The essential characteristics are summarized in the claims.

Referring to the drawing, Fig. 1 is an assembly view showing one form of tappet and its relation to a valve mechanism and operating cam therefor; Figs. 2 and 2a are plan and central sectional views respectively of one form of tappet; Figs. 3 and 3a are views corresponding to Figs. 2 and 2a but showing a different form; Figs. 4 and 5 are central longitudinal sectional views of still other forms of tappet; Fig. 6 is a perspective view showing the manner of adjustment of the improved tappet; Fig. 7 is an enlarged fragmentary central sectional view illustrating the action of an ordinary lock nut and screw arrangement commonly used for tappet adjustment, and Fig. 8 is an enlarged fragmentary central sectional view of the present device in one form and showing how adjustment is maintained by the use of the present invention.

Because of manufacturing tolerances in dimensions and because of wear on operating parts, internal combustion engine valve mechanisms usually require some means of adjustment. Adjustment is usually provided at the tappet. The common adjusting device for this is illustrated in Fig. 7, the tappet barrel being shown at A and an adjustment screw at B, which adjustment screw may be turned in one direction to shorten the effective length of the tappet and in the opposite direction to lengthen the tappet. Such screw would ordinarily work loose even though originally tightly threaded in the barrel, and the common expedient for locking the screw is the provision of a lock nut illustrated conventionally at C. After adjustment of the screw, the lock nut is turned tightly against the end face $a$ of the tappet barrel, causing any play in the threads to be taken up by abutment between the male and female threads of the barrel and screw as at $b$ and between the lock nut threads and screw as at $b'$. From inspection of Fig. 7, it is apparent that the abutment at $b'$ has to carry all the load in resisting impact in operating the valve. In other words, the forces exerted on the tappet by the cam or operating devices at one end and by the valve or operated devices at the other, are opposed only by the lock nut threads, with no assistance from the threaded connection between the screw threads and barrel threads. The tendency for the tappet parts to get out of alignment or to work loose is due principally to inadequate thread face contact area between the lock nut and screw. In automobile engine design, it is impractical to provide sufficient thread contact area at the lock nut to be certain to hold the adjustment over long periods and moreover,—using a lock nut—it is difficult to obtain the proper adjustment because drawing down on the lock nut disturbs the adjustment between the screw threads and barrel due to thread clearances which vary and an estimated allowance has to be made for this. Moreover, in adjusting conventional tappets one has to hold the tappet against turning, to hold the screw in adjusted position and to turn the lock nut. It is spoken of as a "three handed" operation. The manner in which the present invention overcomes the problems above discussed will be demonstrated below.

Referring to Fig. 1, 1 indicates a portion of the engine, which portion is bored at 1' to slidably receive the barrel 2 of the tappet. The barrel is cylindrical in form and has, as shown, a hardened contact face plate 3 at one end and an axially adjustable screw 4 at the other. The face plate 3 is acted on, as shown, directly by the cam 5 on the cam shaft 6, which cam raises and lowers the barrel and thence through the screw 4 raises the valve stem illustrated at 7 against the action of its spring 8. There may be other suitable interponents (not shown) between the cam and the tappet and between the tappet and the valve stem. The principles of tappet construction herein illustrated, may be incorporated in the valve stem itself or in any such interponents.

Referring to Figs. 2 and 2a, the barrel 2 is made hollow and integrally closed at one end at 10 and there is provided an inwardly extending sleeve formation at 11, threaded to receive the adjusting screw 4. The barrel, as shown, is made of steel in order that the threads for the screw may be accurately formed and of adequate strength. The hardened plate 3, preferably cast iron with a chilled lower face, may be reduced in diameter at 3' and may be pressed into the end of the barrel opposite the screw and welded in place in any suitable manner.

The adjusting screw has any conventional wrench face arrangement, as at 14, for permitting the screw to be turned to, in effect, lengthen or shorten the tappet for sufficient end clearance to allow the valve to seat properly. The screw, as shown, has, below the threads 15 thereof, a reduced diameter at 16 forming a shoulder for a spring retaining washer 17. The retaining washer is secured to the reduced end of the screw by outwardly flanging the extreme end of the screw, as at 18. Between the washer and the closed portion 10 of the tappet barrel, there is a compression spring, preferably a coil spring 20 of adequate strength when compressed to hold the screw against being turned by the action of the valve operating parts, yet permitting manual adjustment, as will be hereinafter shown.

The action of the spring in increasing adhesion between adjacent thread faces, in other words, frictionally holding the screw in adjusted position is illustrated in Fig. 8. Fig. 8 corresponds, in details of construction, to Fig. 5, but the action is the same in all forms of the invention illustrated. It will be noted that the abutment relationship, indicated at $bx$, between all the threads of the screw and the complementary threads of the barrel, is such that relative impact between the tappet and its operating and operated parts tending to collapse and shorten the tappet, is taken directly by the abutting thread faces, whereas this is not true with the arrangement shown in Fig. 7. In Fig. 7, the thread face abutment corresponding to that illustrated at $bx$ occurs only at $b'$,—in the lock nut. The lock nut threads of Fig. 7 will tend to allow the screw to become loosened and get out of alignment with the axis of the barrel, particularly if the valve is slightly off center with respect to the tappet. With the improved arrangement, likelihood of loosening of the screw in the tappet is greatly lessened and, moreover, the screw is maintained coaxial with the barrel by the greatly increased thread contact opposing collapse of the tappet. The spring 20 in the proportions shown, exerts sufficient force to maintain the screw locked in position at the thread face abutment described. In addition the ends of the spring, in directly engaging the barrel and adjusting screw, has a further tendency to lock the screw in the desired adjusted position.

Provision for supplying oil to the cam through the tappet is made as shown by reason of oil holes 19 near the top of the tappet and a central oil outlet hole 19a in the plate 3. Oil splashed onto the upper face of the tappet and the tappet guide portion 1 of the engine runs into the oil hole 19 when the tappet is raised and runs out onto the cam through the hole 19a.

To assemble the device shown in Fig. 2a, the operator may first turn the adjusting screw into about the position shown before the plate 3 is assembled into the barrel. The spring is then slipped over the tube formation 11, the washer placed over the spring and the spring then compressed by a suitable hollow tool until the washer seats tightly against the shoulder on the screw adjacent the restricted portion 16. A suitable flanging tool is then inserted through the said hollow tool and a single blow suffices to flange the end of the screw outwardly into overlying relationship to the washer as at 18. The face plate 3 is then pressed into the barrel and, as previously stated, welded or otherwise secured in place.

In order to adjust the tappet for length, the barrel is provided with openings at 22 to receive a suitable tool, such as the U-shaped wire tool S of Fig. 6, this having parallel prongs at $s$ bent down to engage the openings 22. The tool S may be held by one hand of the operator and an end wrench shown at W operated by his other hand to adjust the screw. Simplicity of adjustment is a highly desirable feature, as will be appreciated by any one who has adjusted tappets on automobile valves with the conventional adjusting and locking arrangements.

Figs. 3 and 3a show a different form of tappet wherein the entire barrel 2a is of cast iron, this providing a better bearing in the guide bore 1' than the steel barrel of the form previously described. The barrel 2a is bored on two diameters, as at 25 and 26, for the reception of a steel insert 27 for the threads, the insert being shouldered, as at 28, for abutting contact with the barrel. The insert is preferably grooved in its top face as at 29 to provide for removing enough metal from the insert adjacent the bore 25 to permit a good weld being effected between the sleeve and barrel, it being desirable when two members, such as shown, are welded together, that the stock of each member at the weld be of about the same thickness. The openings 22a for the tool S are formed partly in the barrel and partly in the sleeve.

The form of tappet shown in Fig. 3a has several advantages over arrangements on the order of Fig. 2a in addition to providing a better bearing in the guide bore. These advantages also obtain in the arrangement of Fig. 5 which is essentially similar to Fig. 3a in that the barrel portions of both are of cast iron, say cast with the chilled face for engaging the operating cam. In the case of Fig. 2a, the preferred, and possibly the only practical method of adequately securing the chilled faced cast iron insert 3 into the steel barrel, is by an electric welding operation. This is partly because the spring is necessarily in place at the time the insert is secured, this precluding other than temporary application of a very high degree of heat to the barrel. Otherwise the temper of the spring may be drawn. In the case of Fig. 3a however (and Fig. 5), other simple methods of securing the cast iron and steel parts together are practical and will actually greatly lessen the manufacturing cost of the tappet. For illustration, the insert 27 may be "shrunk in" in accordance with the usual "shrinking in" methods. The barrel may be expanded by a suitable application of heat thereto and the insert 27 with the spring assembled thereon then put into place, as shown, and the assembled parts, including particularly the barrel, immediately cooled to prevent impairment of the temper of the spring. It should be noted that in the event this shrinking in method is used for securing the insert 27, adequate reinforcement of the cast iron is provided at the upper end of the barrel, as shown, (see thickened rib providing the various shoulders described). It should be further noted that the oil openings 19 and 19a are useful in preventing impairment of the spring temper whether these openings merely permit air to circulate in the interior of the tappet about the spring or permit entrance and exit of fluid applied specifically for the purpose of cooling.

A further advantage of the arrangement according to Fig. 3a, obtains in that the steel insert 27 may have the spring and retaining washer assembled thereon somewhat more easily. Assembly of the spring, washer and adjusting screw in Fig. 2a is made somewhat difficult by reason of the confined space in which the spring must be compressed and the washer secured, whereas with the arrangement of Fig. 3a, assembly of the spring and washer on the screw and insert does not have to be done in any confined space.

Figs. 4 and 5 illustrate mushroom types of tappet.

Referring to Fig. 4, this differs from Fig. 2a, principally in the shape of the barrel 2b and face plate 3b. These shapes, however, are conventional and need no detailed description in view of the prior art.

The arrangement shown in Fig. 5 is more nearly in accordance with that of Fig. 3a in that the guide surfaces on the barrel 2c are formed on the same piece of metal that includes the hardened face portion 3c for contact with the cam. The insert 27a of Fig. 5 may be pressed into the upper end of the barrel and suitably secured as by welding. In both the mushroom types shown, it is to be understood that the upper end of the barrel portion may have wrench faces, as at 30 and 30a respectively, for holding the barrel during adjustment.

I claim:

1. A valve tappet comprising a body and adjusting screw, internal threads in the body for receiving the screw, a shoulder on said body in fixed longitudinal position relative to the internal threads of the body during relative rotation of the body and screw for adjustment, and a spring interposed between said screw and shoulder and acting to force all the alternate thread faces of the screw resisting axial collapse of the tappet into abutment with the adjacent alternate internal thread faces.

2. A valve tappet comprising a hollow internally threaded body forming one operative end of the tappet, an adjusting screw engaging the body threads and extending therefrom to form the other operative end of the tappet, a shoulder associated with the body, a shoulder on the screw adjustable axially to different positions relative to the aforesaid shoulder consequent upon turning the screw while the screw is in threaded engagement with the body, and a compression spring interposed between said shoulders and acting to maintain the thread faces resisting axial collapse of the tappet in stressed abutting relationship.

3. A valve tappet comprising an internally threaded body, an adjusting screw adapted to engage the threads of said body, the screw extending beyond the threaded portion of the body, a head on the screw, a shoulder formed integrally with the body portion which carries the internal threads, and a compression spring having its opposite ends in stressed abutment with the said head and shoulder respectively for maintaining thread face contact between the threads of the body and screw opposing axial collapse of the tappet.

4. A valve tappet comprising a hollow tappet body, said body including an internally threaded sleeve secured in axially fixed position in the body, an adjusting screw threaded into the sleeve and extending inwardly past the inner end of the sleeve into the hollow body, and a compression spring interposed in compressed condition between the inwardly extending screw portion and the sleeve, whereby thread face contact between the screw and sleeve threads is maintained in a direction axially of the tappet to positively resist axial collapse of the tappet body and screw.

5. An adjustable length compression element comprising a body and adjusting screw in complementary threaded engagement with each other, said body having means fixed in position longitudinally of the body relative to the body threads during relative rotation of the body and screw for adjustment, and resilient means interposed between the said screw and first mentioned means acting to force all the alternate thread faces of the screw resisting axial collapse of the element into abutment with the adjacent alternate thread faces of the body resisting axial collapse.

6. An adjustment screw unit for a valve tappet having a body, a screw and sleeve in mutual threaded engagement with each other, said screw having an operating head at one end, resilient means operatively interposed between the sleeve and the end of the screw opposite to said head, one end of the resilient means abutting the said opposite end of the screw and the other end of the resilient means abutting the sleeve, said means being operable to urge the sleeve and screw in the direction of relative axial collapse of the head toward the sleeve, said sleeve being adapted to be secured to a tappet body member in fixed circumferential and longitudinal position with the head exposed exteriorly of the body.

7. An adjustable length compression element of the class described, comprising a hollow body having an internally threaded sleeve portion extending inwardly, axially thereof, an adjustment screw in threaded engagement with said threaded portion of the body and extending inwardly past said threads, at one end, a shoulder on the inwardly extending end portion of the screw, and resilient compression means in stressed abutment with said shoulder at one end, the opposite end of the resilient compression means surrounding said sleeve portion of the body and being in stressed abutment with the body whereby the cooperating thread faces of the body and screw resisting relative axial collapse of the body and screw are maintained in stressed abutting relationship, said screw and body having external oppositely facing abutment surfaces respectively.

HAROLD M. LOCHRANE.